US008452314B2

(12) United States Patent
Kristiansson et al.

(10) Patent No.: US 8,452,314 B2
(45) Date of Patent: May 28, 2013

(54) TERMINAL CLIENT AND A CLIENT DEVICE FOR MANAGING MESSAGES IN A NETWORK INFRASTRUCTURE OF A TELECOMMUNICATIONS SYSTEM

(75) Inventors: Johan Kristiansson, Luleå (SE); Tommy Amgren, Södra Sunderbyn (SE); Tor Björn Minde, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 480 days.

(21) Appl. No.: 12/738,640

(22) PCT Filed: Nov. 16, 2007

(86) PCT No.: PCT/SE2007/050859
§ 371 (c)(1),
(2), (4) Date: Apr. 18, 2010

(87) PCT Pub. No.: WO2009/064233
PCT Pub. Date: May 22, 2009

(65) Prior Publication Data
US 2010/0216495 A1    Aug. 26, 2010

(51) Int. Cl.
*H04W 4/00* (2009.01)
(52) U.S. Cl.
USPC ........ 455/466; 455/412.1; 455/502; 709/203; 379/88.22
(58) Field of Classification Search
USPC ............... 455/466, 412.1–415; 709/203, 206
See application file for complete search history.

(56) References Cited

U.S. PATENT DOCUMENTS

| 6,125,281 | A  | * | 9/2000  | Wells et al. ............ 455/466 |
| 6,779,002 | B1 | * | 8/2004  | Mwaura ..................... 1/1 |
| 7,206,571 | B2 | * | 4/2007  | Kuroda ................... 455/415 |
| 7,466,810 | B1 | * | 12/2008 | Quon et al. ............. 379/201.01 |
| 7,606,554 | B1 | * | 10/2009 | Bonner et al. ........... 455/403 |

(Continued)

FOREIGN PATENT DOCUMENTS

| EP | 1914957 A1    | 4/2008  |
| WO | 2004/086784 A1 | 10/2004 |
| WO | 2006/053019 A2 | 5/2006  |

OTHER PUBLICATIONS

Swedish Patent Office, Int'l Search Report in PCT/SE2007/050859, Sep. 22, 2008.

(Continued)

*Primary Examiner* — Sharad Rampuria
(74) *Attorney, Agent, or Firm* — Potomac Patent Group PLLC (57) ABSTRACT

The present invention relates to a terminal client (101), a client device (100, 200, 300, 400) and a network infrastructure for enabling management of messages in a telecommunications network. According to the invention, the terminal client (101) comprises a distributed inbox client component (103) that is configured to synchronize all incoming and outgoing messages with at least one other client device (200, 300) that is associated with a user of a first client device (100). The terminal client (101) further comprises a connector component (104) configured at least as an interface between the distributed client component (103) and a network infrastructure (20) suitable for forwarding and receiving messages. With the terminal client (101) incorporating in client devices associated with a user, the user is able to experience synchronized chat in real-time and can further utilize a device independent synchronous messaging service anywhere and anytime.

22 Claims, 6 Drawing Sheets

U.S. PATENT DOCUMENTS

| | | | |
|---|---|---|---|
| 8,316,128 B2* | 11/2012 | Beck et al. | 709/226 |
| 8,340,631 B2* | 12/2012 | Mann et al. | 455/405 |
| 2002/0183044 A1* | 12/2002 | Blackwell et al. | 455/412 |
| 2003/0217096 A1* | 11/2003 | McKelvie et al. | 709/202 |
| 2004/0010510 A1* | 1/2004 | Hotti | 707/103 R |
| 2005/0043051 A1 | 2/2005 | Takano et al. | |
| 2005/0176409 A1* | 8/2005 | Carpenter | 455/412.1 |
| 2005/0278425 A1 | 12/2005 | Wilsher et al. | |
| 2007/0208803 A1* | 9/2007 | Levi et al. | 709/203 |
| 2007/0259677 A1* | 11/2007 | Waxman | 455/466 |
| 2010/0161683 A1* | 6/2010 | Leeds et al. | 707/803 |
| 2010/0190474 A1* | 7/2010 | Rajguru | 455/412.1 |

OTHER PUBLICATIONS

Swedish Patent Office, Written Opinion in PCT/SE2007/050859, Sep. 22, 2008.

IBM, A Method of Retaining Instant Messaging Chat History when Using Multiple Instances of the Same Client on Different Host Systems, IPCOM000158517D, Sep. 21, 2007, p. 1, ip.com.

* cited by examiner

TERMINAL CLIENT AND A CLIENT DEVICE FOR MANAGING MESSAGES IN A NETWORK INFRASTRUCTURE OF A TELECOMMUNICATIONS SYSTEM

TECHNICAL FIELD

The present invention relates generally to management of messages in communication networks and devices and more particularly to management and delivery techniques of messages, such as short message service (SMS) messages, within such networks.

BACKGROUND

Today almost all portable devices are equipped to send and receive messages, such as short message services and multimedia messaging services (MMS). Contrary to the voice service, a SMS service is considered to be the perfect service for asynchronous communication since it allows short and simple text messages to be read and answered to anywhere and at anytime. SMS enables individuals to send and receive text messages on communication channels that are usually separate from a voice call channel. In addition, SMS messages do not require a wireless telephone to be activated or within range in order to handle a message. In the event where a receiving device is not available, the SMS message is stored in an SMS message center (SMS-C) for a predetermined time period until the device becomes again active. A further advantage with SMS is that an active device is able to receive or send a SMS message independent of whether or not a voice or data call is in progress.

While SMS allows individuals to send simple messages to other users from almost any location in the world, many users use today Instant Messaging services such as MSN or GoogleTalk available on the Internet for more advanced and synchronous text communication. That is, they communicate using a format based on ongoing conversation allowing the user to see a history of sent and received messages. In contrast to SMS, Instant Messaging applications typically allow users to chat in real-time with friends by text, voice and also video. Additionally, it is typically possible to send files, photos, choose background pictures or exchange presentation material etc. Some services such as GoogleTalk also allow the users to access messages via a central web service, or from any device having GoogleTalk installed.

Currently, the industry is investing on how to make Instant Messaging services available in the mobile phones domain as well as fixed Internet domain to provide users with more advanced text communication systems. For example, one usage of the IP Multimedia Subsystem (IMS) is to provide real-time communication services for mobile phones as well as standard desktop computers.

To increase the number of users reachable from a system, attempts have been made on developing multi-protocol clients to provide interoperability between various systems. For example, with MSN Mobile messaging it is possible to send regular SMS from MSN clients running on desktop computers, to a user with a regular mobile phone. It is also possible to reach MSN users with SMS using predefined recipients. Similar functionality is also provided by other systems, for example ICQ.

Therefore, although many users consider SMS to be the perfect service for mobile asynchronous communication, it has several limitations such as lack of real-time chat support and limited support for sending messages from other devices than the user's mobile phone. For example, today it is generally not obvious how to send and receive messages from web services. For example, as the service provider usually maintains a separate subscription or a set of subscriptions not corresponding to the user's subscription, it is generally not easy to reply to SMS messages sent from the web service. A related problem is that the recipient will generally not recognize the originator's phone number as the messages are sent using the service provider's own subscription. Moreover, as the actual SMS messages are stored on the user's mobile phone, they can generally not be accessed from other devices. For example, if the user purchases another phone or resets the phone, all SMS messages are typically erased.

Memory and storage limitation is another problem with current SMS solutions. Off-line handling of SMS such as messaging archiving and history management are not supported today.

In addition, presence information is generally not available, that is, it is not possible to see if a specific recipient is active and on-line; a functionality which is provided by most Instant Messaging systems today. However, instead of presence information users can set a flag in the SMS message to get a status report message (from SMS-C) that tells whether a SMS message has reached the recipient mobile phone or not.

Moreover, it is hard to chat with multiple users at the same time since the messages are only arranged by time. For example, allowing the user to switch between different chat conversations is typically not supported today.

In addition, users that possess several devices, including a data communication device, a cellular phone, a personal digital assistant etc. often find it inconvenient to continually make use of only one of the devices to receive/send a SMS message. In the U.S. patent No. 2005/0176409; a solution is provided that enables the delivery of SMS messages simultaneously to two or more wireless communication devices that are associated with a single user. In this prior art solution, a SMS message is delivered to a first device identified by a first address as well as to a second device indentified by a second address which is different from the first address. This way, the SMS is received regardless of which wireless device is being used at any given moment by the user. A drawback with this solution is that since each SMS message is identified using different addresses associated with the user, the user needs as many subscriptions as the number of addresses. In addition, the solution described in this prior art is restricted to wireless devices.

As mentioned earlier, it is possible to send a SMS message from MSN clients running on desktop computers, to a user with a regular phone. On the other hand, if a user wishes to send a SMS message using Instant Messaging solutions available on the Internet today, he/she has to install MSN messenger or GoogleTalk or ICQ etc. However, these instant messaging solutions are generally not optimized to run on mobile phones. For example, today users have to start and configure separate e.g. Java Midlets applications to run external applications, which are not particularly well integrated with the rest of the mobile phone software. As a result, a significant amount of user interaction is typically required to utilize a third party service such as an Internet-based Instant Messaging service running on a mobile phone. Additionally, running multi-protocol clients to provide interoperability between various communication systems (e.g. sending SMS from an ICQ client) on mobile phones adds a significant amount of complexity, thus requiring even more user interaction making multi-protocol solutions less suitable for mobile phones.

SUMMARY

An object of the present invention is thus to obviate at least some of the above disadvantages by providing a procedure for allowing users to utilize a device-independent synchronous messaging service anywhere, anytime based for example on regular/standard SMS.

According to a first aspect of the invention, the above stated problem is solved by means of a terminal client that is suitable for use in a client device of a user/individual. The terminal client is configured to enable management of messages, such as SMS messages, in a telecommunications system. According to the present invention, the terminal client comprises a distributed inbox client component for synchronizing all incoming and all outgoing messages, with at least one other distributed inbox client component in at least one other client device associated with the user/individual. The terminal client further comprises a connector component configured at least as an interface between the above mentioned distributed inbox client component and a network infrastructure of the telecommunications system and further configured to be used by the distributed inbox client component to both receive and send the messages. Furthermore, the distributed inbox client component is configured to synchronize incoming and outgoing messages independently of which client device that is being used for the moment by the user. Thus, the distributed inbox client component of the terminal client according to the present invention makes it possible for the user to reach its message inbox anywhere and anytime and on any client device he/she possesses. Furthermore, the distributed inbox client component of the terminal client enables, according to the present invention, synchronization of chat sessions based on e.g. SMS messages, with at least one other distributed inbox client component in at least one other client device associated with the user.

According to another aspect of the present invention, the above stated problem is solved by means of a client device that comprises a terminal client in accordance with the present invention. Thus, all client devices that are associated with the user are configured to comprise the terminal client.

According to yet another aspect of the present invention, the above stated problem is solved by means of a network infrastructure of a telecommunications system comprising a client device according to the present invention.

An advantage with the present invention is that the messages can be sent and received independently of the device currently used by the user since the distributed inbox client component of the terminal client allows, according to the present invention, users to access their messages, e.g. access their SMS inbox, anywhere, anytime from any client device incorporating the terminal client.

A further advantage with the present invention is that users can experience a synchronous real-time chat based on e.g. regular SMS.

Yet another advantage with the present invention is that users are identified by a single identification number such as a telephone number, and not by e.g. a dedicated subscription provided by a third party supplier when using other devices than the user's device.

An additional advantage with the present invention is that, in the case where SMS is the service used to send/receive messages from client devices according to the present invention, no changes are required in the existing SMS infrastructure, i.e. backward compatibility with regular SMS and/or protocols is achieved.

A further advantage with the present invention is that a significant amount of user interaction is not necessary in order to achieve management of messages using a terminal client, a client device and a network infrastructure in accordance with the present invention.

The present invention will now be described in more details by means of several embodiments and with reference to the accompanying drawings, attention to be called to the fact, however, that the following drawings are illustrative only, and that various modifications and changes may be made in the specific embodiments illustrated as described within the scope of the appended claims.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The present invention is described herein by way of reference to particular example scenarios. In particular the invention is described in a non-limiting general context in relation to an exemplary wireless network such as GSM (Global System for Mobile Communications), GPRS (General Packet Radio Service), EDGE (Enhanced Data rates for GSM Evolution), WCDMA (Wide band Code Division Multiplexing Access), CDMA (Code Division Multiplex Access), GPS (Global Positioning System), JDC (Japanese Digital Cellular), WIMAX (Worldwide Interoperability for Microwave Access), WLAN (Wireless Local Area Network) or any other type of wireless system that supports transmission and reception of messages, e.g. SMS message, to/from a device.

As is well known in the art, SMS is a technology or a service that enables sending and receiving of messages between mobile devices almost anywhere in the world. Using SMS, a user can at most send 140 bytes (1120 bits) of data; allowing a SMS message to contain up to 160 characters if 7-bit character encoding is used. (7-bit character encoding is suitable for encoding Latin characters like English alphabets.); and to contain up to 70 characters if 16-bit Unicode UCS2 character encoding is used. (SMS text messages containing non-Latin characters like Chinese characters should use 16-bit character encoding.).

Figure 1:
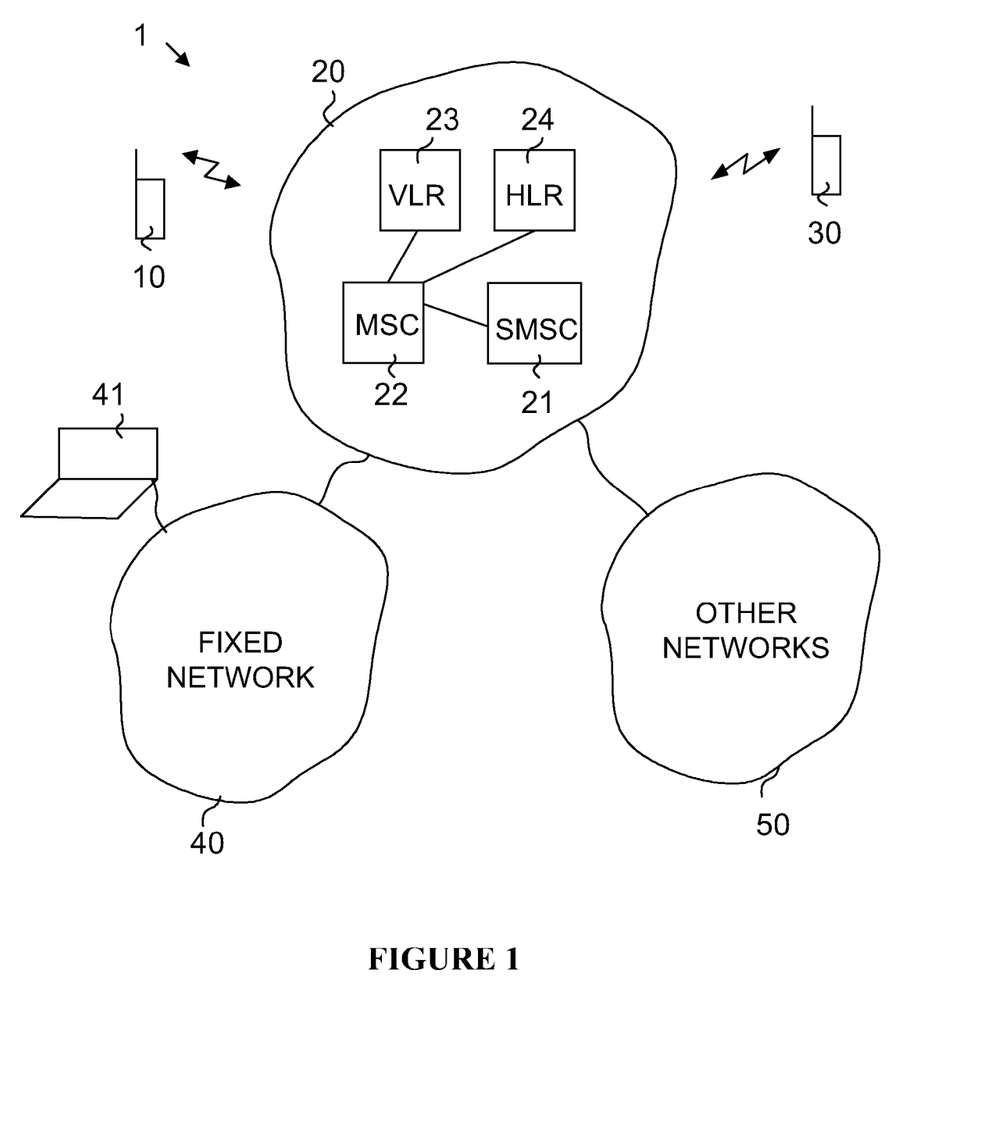
FIG. 1 is a simplified block diagram illustrating the principles of a prior art telecommunications network where the different exemplary embodiments of the present invention maybe applicable.

Referring to FIG. 1, there is illustrated a simplified block diagram of a telecommunications network system 1 supporting the transmission/reception of a SMS message from a first wireless device 10 to a second wireless 30. Devices 10 and 30 are here shown connected to a SMSC 21, Short Message Service Center, of a wireless network 20. The SMSC 21 is a store-and-forward server. The main duty of the SMSC 21 is thus to route SMS messages and control the store-and-forward process. An SMS message is stored temporarily in the SMSC 21 if the recipient's mobile phone is offline. It is possible to specify the period after which the SMS message will be deleted from the SMSC 21 so that the SMS message will not be forwarded to the recipient mobile phone when it becomes online. SMS is thus a best effort service as it is not always guaranteed that all messages are delivered. In FIG. 1, the network 1 also depicts other networks 40, 50, that may be connected to the wireless network 20. These networks may represent a fixed IP network 40 or any other type of network 50. The wireless network also includes other important well known elements such a mobile switching center MSC 22, a VLR, visitor location register, 23, a HLR, home location register, 24 and other elements (not shown) such as a base station or a NodeB.

Also illustrated in FIG. 1 is a computer device 41 such a personal computer (PC) or a laptop connected to the wireless network via the fixed network 40. The SMSC 21 maybe integrated in a gateway MSC and an interworking MSC. The gateway MSC is a function for receiving a SMS from a SMSC, interrogating the HLR 24 for routing information and SMS info and delivering the SMS to the recipient 30. An interworking MSC is a function for receiving a SMS from within the network and submitting it to the recipient 30. Other messages which may be delivered are MMS, multimedia messaging services. In order for devices 10 and 30 to be able to send/receive SMS messages, a SMS client is required.

Figure 2:
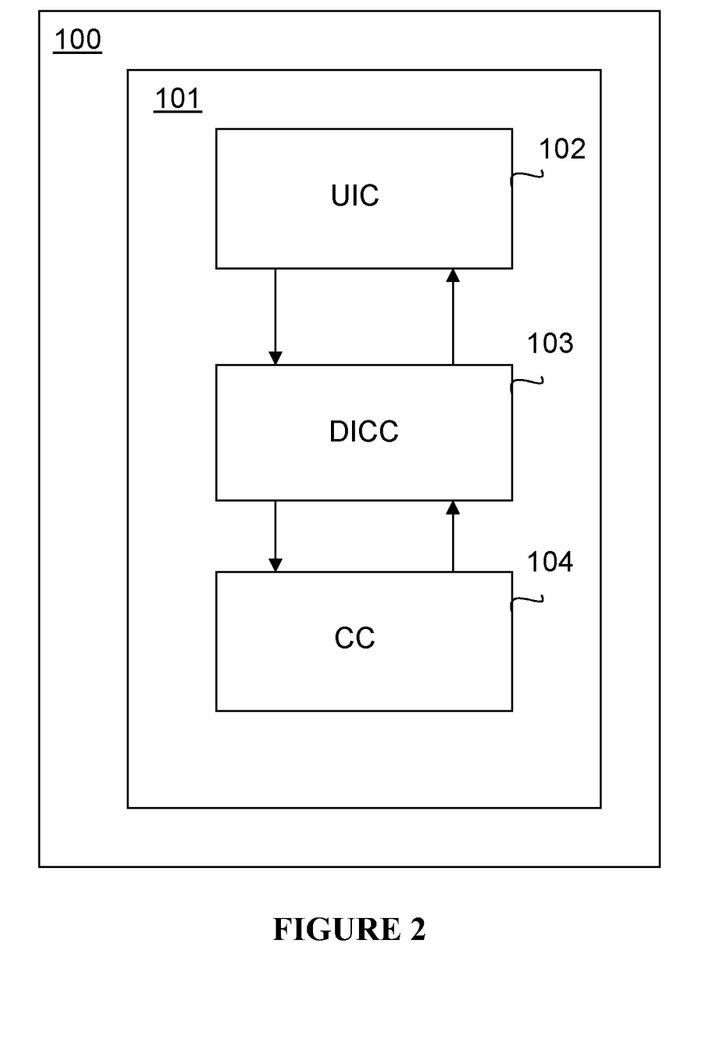
FIG. 2 illustrates an overview of a terminal client in accordance with exemplary embodiments of the present invention.

Referring now to FIG. 2 there is illustrated an overview of a terminal client (TC) 101 in accordance with exemplary embodiments of the present invention, for use in a client device 100 of a user and for enabling management of messages (e.g. SMS messages) in a telecommunications system such as the system 1 depicted in FIG. 1.

As shown, the terminal client 101 of device 100 comprises a distributed inbox client component 103 (DICC), a connector component 104, denoted here a SMS connector component (SMS-CC) 104, and a user interface component 102 (UIC). According to exemplary embodiments of the present invention, the distributed inbox client component 103 is configured to synchronize all incoming and outgoing messages (e.g. SMS messages) with each distributed inbox client component installed or incorporated in other client devices associated with the user. As an example, if a user possesses a first client device 100, e.g. a mobile phone, with a terminal client 101 and a second client device, e.g. a personal computer or a laptop, also with a terminal client 101, then the distributed inbox client components 103 in the mobile phone and the laptop respectively, are, according to embodiments of the present invention, configured to automatically synchronize all incoming and all outgoing SMS messages with each other. This is also the case if the user possesses more than two client devices, provided that each one of those devices includes the terminal client 101. Thus the distributed inbox client components 103, according to embodiments of the present invention, make sure that incoming and outgoing messages are reachable anywhere, anytime, independently on which device the user is using at the moment. In other words, when a SMS message is received/sent by a first client device (e.g. a first mobile phone) of a user, it also becomes available to terminal clients running on a second client device (e.g. a second mobile phone) of said user and on a third client device (e.g. a PC or laptop) of said user.

Referring back to FIG. 2 the connector or the SMS connector component 104 of the terminal client 101 is, according to embodiments of the present invention, configured as an interface between the distributed inbox client component 103 and a network infrastructure (e.g. the SMS infrastructure 20 of FIG. 1) and is also configured to be used by the distributed inbox client component 103 to both receive and sent messages. The connector component 104 enables, according to embodiments of the present invention, a user to reach a SMS message on any other device available to him/her without using an additional subscription, i.e. the user uses the same subscription associated with the user's client device (e.g. a mobile phone) and is still able to reach a SMS message from other client devices such as a PC, a laptop, a web server etc. using the same subscription. This is possible since a received/sent message can be identified using the telephone number of the sender/receiver. Therefore, by having a terminal client installed/incorporated in all devices possessed by the user having a single subscription, synchronization between the terminal clients i.e. between the distributed inbox client components in the terminal clients can be achieved. Note that synchronization is achieved because the connector component 104 is responsible for receiving/sending SMS messages to/from a terminal client and is further responsible for redirecting the received/sent message(s) to the distributed inbox client component(s).

According to embodiments of the present invention, each received/sent message that the distributed inbox client component is configured to synchronize with other distributed inbox client components associated with terminal clients of devices associated with the user, may be encapsulated in a new format containing additional headers that include at least the telephone number of the originator and the telephone number of the recipient in addition to a timestamp. Thus, since each message can be classified based on the header(s) information, it is possible to group messages (e.g. SMS messages) into sessions and hence be able to obtain a synchronous chatting experience. Hence, by classifying the messages and group them the user can be presented with all messages as a single thread on the same display. The messages can be present to the user by using the user interface component 102 of the terminal client 101. As an example, when User A receives a message from User B, it is presented by the user interface 102 on the same display, based on the timestamp the message was sent or received. By arranging the message according e.g. to the timestamp header, it becomes possible, according to an embodiment of the present invention, to implement a chat history which may resemble to the chat history shown below:

Message 1 (from User A)
    Message 2 (from User B)
    Message 3 (from User A)
    Message 4 (from User A)
    Message X (from User A or User B)

In addition, synchronization between the distributed inbox client components 103 each associated with two or more devices owned by a user can, according to exemplary embodiments of the present invention, be achieved by storing each message as a separate file having a unique file name which may be based on the field headers of the message and by further using a synchronization protocol to update the distributed inbox client components 103 associated with the user. Protocols that could be used are Rsync (remote sync) and/or SCP (secure copy) which are known protocols used to synchronize files between devices. Note that the present invention is not restricted to the above mentioned protocols, i.e. any other suitable protocol for synchronizing files/messages can be used.

Thus, according to exemplary embodiments of the present invention, a distributed inbox client component 103 can, as soon as it receives or stores a message, synchronize/transfer the received message i.e. the received file having a unique file name, to at least one other distributed inbox client component 103 in a at least one other terminal client 101 in at least one other client device 100 associated with the user.

According to another exemplary embodiment of the present invention, changes that a user makes off-line and/or on-line to a message e.g. to a SMS message are also synchronized using the distributed inbox client component 103 of the terminal client 101. As an example, if a user having a client device, such a mobile phone, with a terminal client 101, makes changes off-line to a SMS message, the changed SMS message can be synchronized and thus sent to other client devices associated with the user when the terminal client 101 and/or the client device 100 becomes connected again to the network. This is also applicable if a client device 100 is a PC or PDA.

It should be noted that the present invention and its embodiments allows a client device having a terminal client according to the present invention, to also send and receive messages to other client devices with a regular/standard client. In other words, a terminal client in accordance with embodiments of the present invention is backward compatible with regular/standard terminal clients. Thus, changes to the standard SMS infrastructure is not required to implement the different embodiments of the present invention.

According to the present invention, if a user having a regular/standard SMS client wishes to take advantage(s) of the terminal client according to the present invention, this user may register and/or download the terminal client into his/her device. Thus, after the user has e.g. downloaded and installed the terminal client 101 on his/her client device (e.g. a mobile phone and/or a PC and/or a laptop and/or a PDA), he/she can experience synchronous chat sessions and synchronization of messages based on e.g. regular SMS.

As an example, the user may download the terminal client 101 after he/she received an invitation message by email or by SMS or by MMS or by any other means i.e. based on any other carrier (via cable, wirelessly, etc.). The invitation may include instructions on how to register to e.g. a registration server and may further include details on how the terminal client can be downloaded and installed. The registration server may be provided by a network operator or by a service provider as a means to prevent unauthorized/unauthenticated usage of the terminal client 101. The registration server may therefore also handle authorization and authentication of users willing to use the terminal client 101. As well known in the art, a registration server may be configured in different ways depending on deployment scenarios and therefore the present invention is not restricted to a use of a registration server and therefore its functionalities are not discussed further.

Referring back to FIG. 2, the terminal client 101 according to the present invention enables a user to create, search, sort, delete, visualize, manage messages, group them i.e. group managements (address, book, contact list) etc. using user interface component 102. Thus the user interface component 102 can be seen as the interface between the user and the rest of the system. Note that in FIG. 2, the client device 100 comprises other elements or other components such as a platform component including an operative system, a keyboard or a touchpad, a controller, a battery interface, a radio frequency receiver (in case the client device is a mobile phone a laptop, a PDA or a PC with an antenna), a SIM card holder (in case the client device is a mobile phone), a CPU and other components all depending on the type of client device the user possesses. The client device may also be a web server, a gateway server or any other client device suitable for incorporating the terminal client according to the present invention.

In the following, there are discussed, in conjunction with FIGS. 3-6, exemplary scenarios in which the present invention and its exemplary embodiments can be used.

Figure 3:
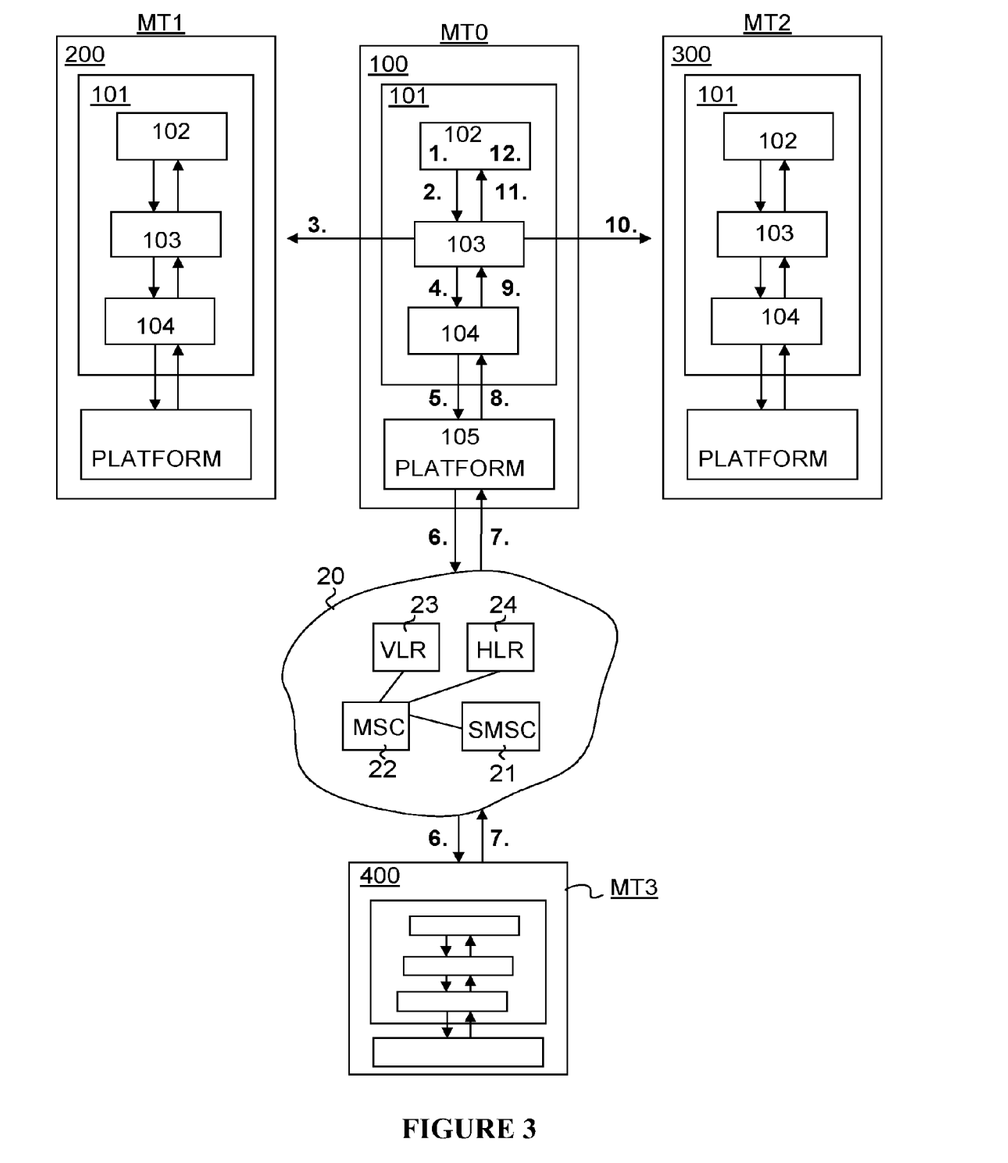
FIG. 3 illustrates an overview of a first exemplary scenario according to an exemplary embodiment of the present invention.

In FIG. 3 a client terminal 101 is, according to an exemplary embodiment of the present, integrated/installed in a client device 100 which in this example is a mobile telephone (MT0). In this scenario, the process of sending messages from client device 100 to another client device (e.g. another mobile phone) with another terminal client 101 and/or with a regular (prior art) client is described. The process of receiving a message from another client device with another terminal client or with a regular client is also discussed.

As seen from FIG. 3, MT0 100 comprises in addition to a user interface UIC1 102, a distributed inbox client terminal DICC 103 and a connector component CC 104 (e.g. SMS connector component). A platform 105 is also provided. The sending/reception of messages maybe conducted via a network 20 similar to the network shown in FIG. 1.

In this scenario it is assumed that the connector component 104 is integrated with the mobile phone's native software or operating system. The connector component 104 is considered connected to, or is part of the mobile phones platform software 105. It is further assumed that connector component 104 can intercept messages before they are stored in the native inbox in the mobile phone MT0 100.

The transmission/reception of messages (e.g. SMS messages) using a terminal client and a client device according to embodiments of the present invention are illustrated in FIG. 3 and described below:

1. The user of client device 100 i.e. the user of MT0 100, starts the terminal client 101, writes a message and selects a receiver which in this exemplary embodiment is MT3 400. The message may be shown in user interface 102 of client terminal 101.
2. The message maybe saved into the local part of the distributed inbox client component 103 (sub-set of all messages arranged by user, date and time, etc.).
3. The local distributed inbox client component 103, according to embodiments of the present invention, initiates synchronization with all other distributed inboxes associated with other client devices of the user. The other client devices are represented in FIG. 3 as MT1 200 and MT2 300 which are considered to include a terminal client 101 according to embodiments of the present invention. Note again that although the user possesses MT0 100, MT1 200 and MT2 300, he/she receives the composed message, composed in step 1, even though he/she only has a single subscription with a single telephone number.
4. The message is then forwarded/sent to the connector component 104.
5. The connector component 104 further sends the message using the mobile phone's native platform software (via platform dependent procedures calls).
6. The message is then sent to the receiving party MT3 400 via the network 20 or via the SMSC 21 of network 20. Note that the receiving party is the one previously selected by the user in step 1.
7. In this step, it is assumed that a message or messages is/are received from other users via the network 20 or via the SMSC 21 of network 20. In this example, a message is received from MT3 400 via network 20 or via SMSC 21.

8. At client device 100 (i.e MT0), the message(s) is/are intercepted by the connector component 104.
9. The local part of the distributed inbox client component 103 receives and stores the message intercepted by the connector component 104.
10. The local distributed inbox client component 103 initiates synchronization with all other distributed inbox client components associated with the user i.e. with distributed inbox client component in client devices MT1 200 and MT2 300 that are both associated with MT0 100.
11. The received message is loaded into the user interface component 102.
12. Finally, the received message is presented in the user interface component 102. Note that in case the user switches from MT0 100 to MT1 200 he/she is still able to read the received message since the distributed inbox client components of MT0 100, MT1 200 and MT2 300 are all synchronized.

It should ne noted that as mentioned earlier, synchronization can be implemented in different ways. As an example, synchronization could be achieved using Bluetooth, USB and or by using different protocols such as SyncML (Synchronization Markup Language) or the protocols mentioned earlier Rsync and/or SCP and can further be performed via an internet fixed connection and/or a mobile/wireless connection.

Figure 4:
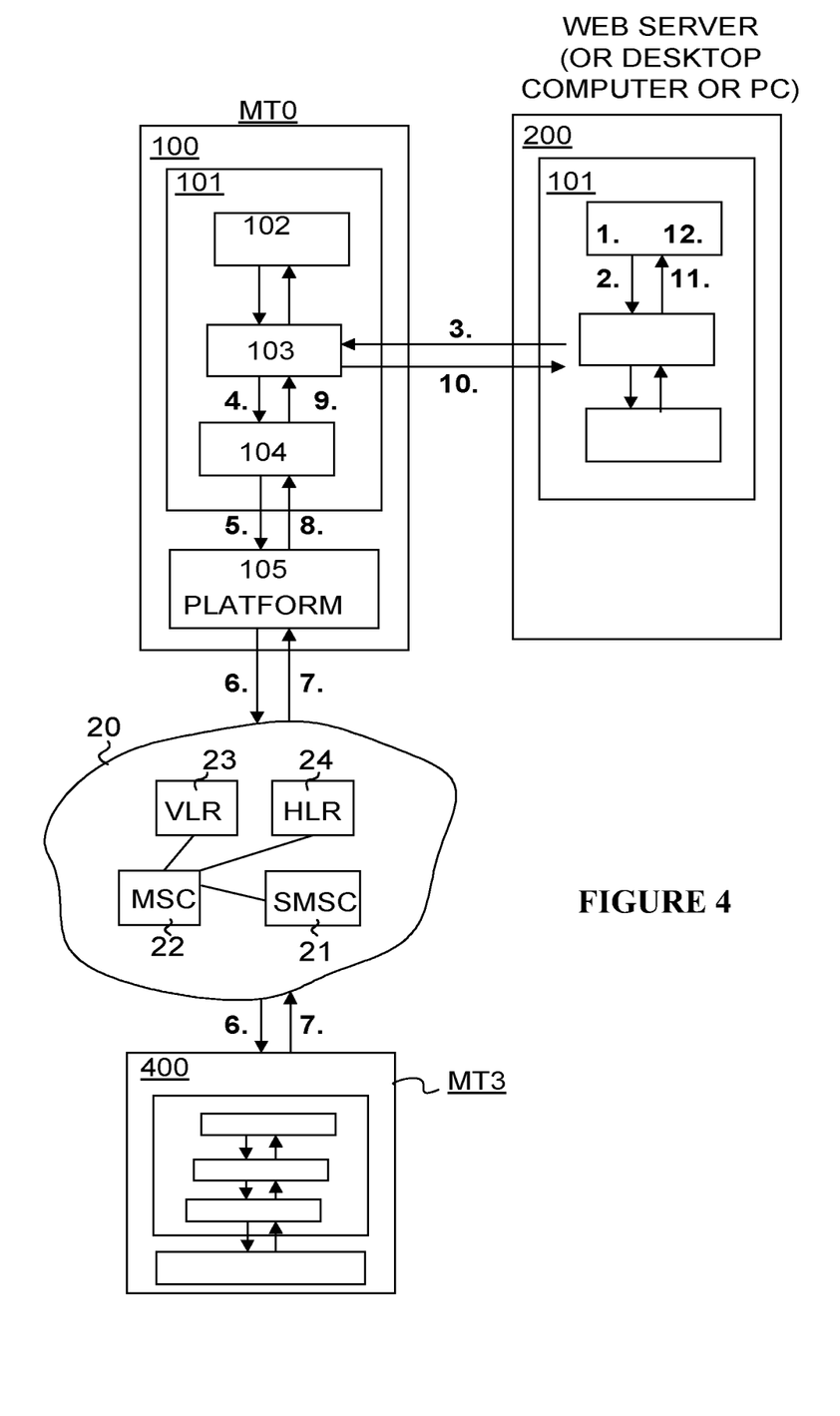
FIG. 4 illustrates an overview of a second exemplary scenario according to another exemplary embodiment of the present invention.

In FIG. 4 there is illustrated another exemplary scenario in accordance with another exemplary embodiment of the present invention. In this scenario, it is assumed that the sending or the receiving of messages (e.g. SMS messages) is performed either from/to a web server that is accessed by a user from a desktop computer or from a PC of the user, or is performed from a desktop computer or a PC of the user. Thus in this example, the terminal client 101 according to embodiments of the present invention is assumed to be incorporated/installed in the web server 200 or the desktop computer. Furthermore, in this exemplary embodiment, and contrary to existing web-based messaging (e.g. SMS) solutions, all messages are sent and received via the user's mobile phone MT0 100 instead of using an additional subscription maintained by e.g. a service provider. In other words, MT0 100 with a terminal client 101 according to embodiment of the present invention, is here considered to serve as a personal message router (or as a virtual message gateway) that is accessible from an external device i.e. from the web server or from the desktop computer 200. Note that since the web server or the desktop computer 200 and MT0 100 have a client terminal 101 installed/incorporated therein, all previously described components (i.e. UIC, DICC and CC) are included in the terminal client 101. Furthermore, as the user has the terminal clients 101 installed both on a desktop computer/web server 200 and on the mobile phone MT0 100, the user has access to two independent distributed inbox client components DICC 103.

In the scenario depicted in FIG. 4, instead of sending a message from the mobile phone MT0 100, the user composes, sends and receives a message via the web service/desktop computer 200, which is then synchronized with the distributed inbox client component running in the mobile phone MT0 100. A sequence diagram illustrating the sending and receiving of a message is depicted in FIG. 4 and described below:

1. The user of client device 200 (web server or desktop computer), starts the terminal client 101, writes/composes a message and selects a receiver which in this exemplary embodiment is MT3 400. The message may be shown in the user interface of client terminal 101.
2. The message maybe saved into the local part of the distributed inbox client component 103 (sub-set of all messages arranged by user, date and time, etc).
3. The local distributed inbox client component 103, according to embodiments of the present invention, initiates synchronization with all other distributed inboxes associated with one or several client devices of the user. In this example only one other client device is shown, namely MT0 100.
4. The message is then forwarded/sent to the connector component 104 by the distributed inbox client component 103 of MT0 100.
5. The connector component 104 further sends the message using the mobile phone's native platform software (via platform dependent procedures calls).
6. The message is then sent to the receiving party MT3 400 via the network 20 or via the SMSC 21 of network 20. Note that the receiving party (MT3 400) is the one previously selected by the user in step 1.
7. In this step, it is assumed that a message or messages is/are received from other users via the network 20 or via the SMSC 21 of network 20. In this example, a message is received from MT3 400 via network 20 or via SMSC 21.
8. The message(s) is/are intercepted by the connector component 104 of MT0 100.
9. The local part of the distributed inbox client component 103 of MT0 100 receives and stores the message intercepted by the connector component 104.
10. The local distributed inbox client component 103 of MT0 100 initiates synchronization with all other distributed inbox client components associated with the user, i.e. the distributed inbox client component in client device 200 i.e. in the web server or the desktop computer 200. Thus the distributed inbox client component 103 of the web server/desktop computer/PC 200 is updated.
11. The received message is loaded into the user interface component 102 of device 200.
12. Finally, the received message is presented in the user interface component of device 200.

Figure 5:
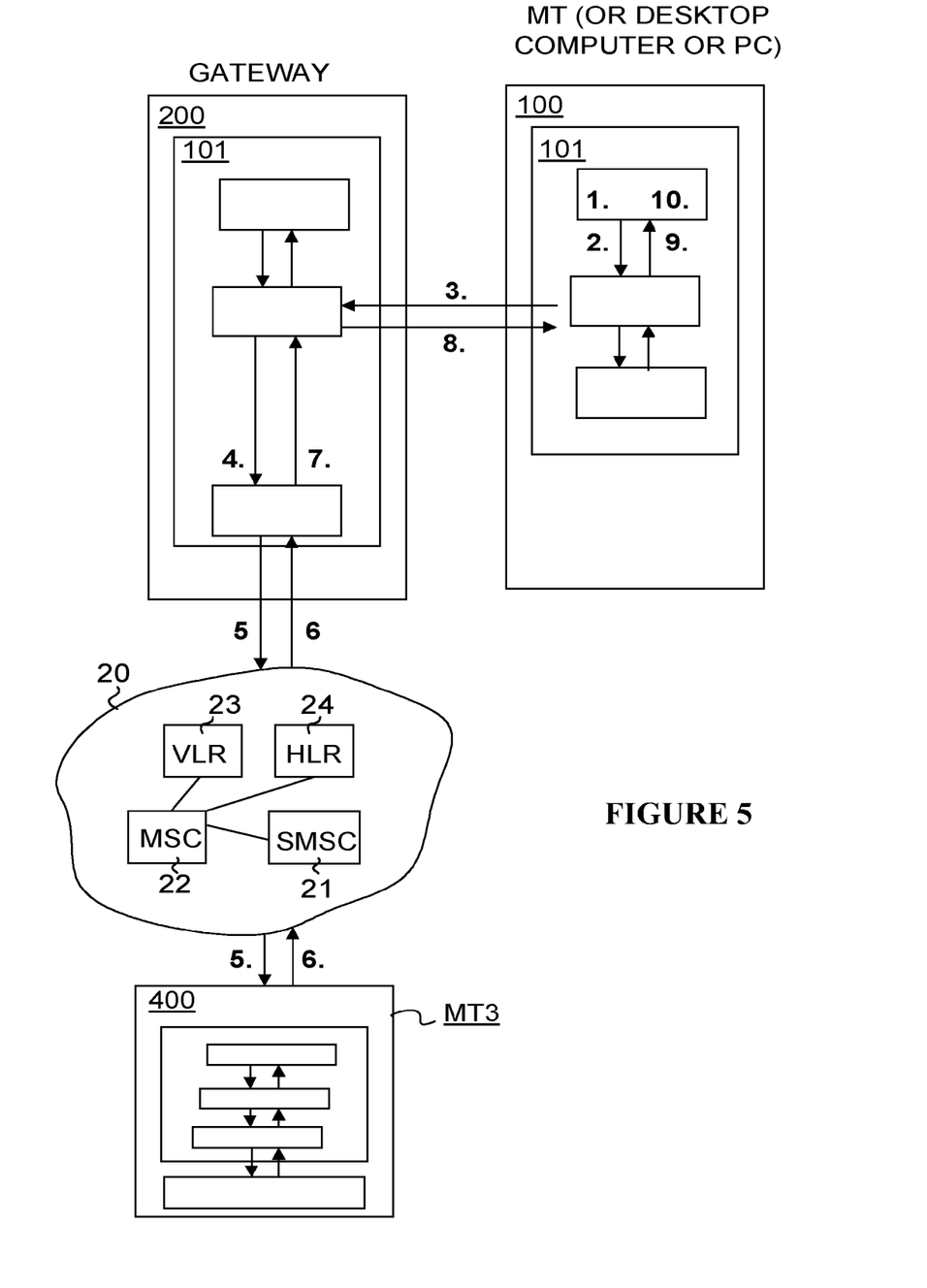
FIG. 5 illustrates an overview of a third exemplary scenario according to another exemplary embodiment of the present invention.

In FIG. 5 there is illustrated another exemplary scenario in accordance with another exemplary embodiment of the present invention. In this scenario, it is assumed that the sending or the receiving of messages (e.g. SMS messages) is not performed from the user's mobile phone or the user's desktop computer or a web server accessed by the user. Instead the sending/receiving of messages is performed via a dedicated gateway device or a gateway network node that is provided by e.g. a service provider and thus resides in the network. In case a SMS message is sent or received, the gateway may be viewed as a SMS gateway. If a MMS is sent, the gateway may instead be viewed as a MMS gateway. The gateway may also be able to send SMS and MMS messages and other messages such as e-mail messages. Thus, the network node representing a gateway in accordance with exemplary embodiments of the present invention is not restricted to a SMS gateway.

The scenario depicted in FIG. 5 is described below:
1. Similar to the previous scenario described in conjunction with FIG. 4, the user of client device 100 (i.e. the mobile phone or the desktop computer/web server in FIG. 5), starts the terminal client 101, writes/composes a message and selects a receiver which in this exemplary embodiment is MT3 400. The message may be shown in the user interface of client terminal 101.

2. The message may be saved into the local part of the distributed inbox client component 103 (sub-set of all messages arranged by user, date and time, etc).

3. The local distributed inbox client component 103, according to embodiments of the present invention, initiates synchronization with all other distributed inboxes associated with one or several client devices of the user. In this example only one other client device is shown, namely the SMS gateway 200.

4. The message is then forwarded/sent to the connector component 104 by the distributed inbox client component 103 of the gateway 200.

5. The message is then sent to the receiving party MT3 400 via the network 20 or via the SMSC 21 of network 20. Note that the receiving party is the one previously selected by the user in step 1.

6. In this step, it is assumed that a message or messages is/are received from other users via the network 20 or via the SMSC 21 of network 20. In this example, a message is received from MT3 400 via network 20 or via SMSC 21, and is/are intercepted by the connector component 104 of the SMS gateway 200.

7. The local part of the distributed inbox client component 103 of gateway 200 receives and stores the message intercepted by the connector component 104.

8. The local distributed inbox client component 103 of gateway 200 initiates synchronization with all other distributed inbox client components associated with the user, i.e. distributed inbox client component in client devices 100 i.e. in the mobile phone web server or the desktop computer 100. That is the distributed inbox client component 103 of the web server/desktop computer/PC 100 is updated.

9. The received message is loaded into the user interface component 102 of device 100.

10. Finally, the received message is presented in the user interface component 102 of device 100.

It should be noted that in the scenario described above, received/send messages may be stored in the gateway 200. Thus a network-based storage system is provided according to an embodiment of the present invention. This way, users can, in addition to view messages, synchronize messages, and look at a history of old messages and backup messages (old and new) etc. in the distributed inbox client component of the terminal client installed in the gateway 200.

It should also be noted that the gateway 200 may comprise a user interface of a terminal client according to the present invention. The user interface may be used e.g. by an operator or by a service provider to configure/install/manage terminal client 100 in the gateway 200.

Figure 6:
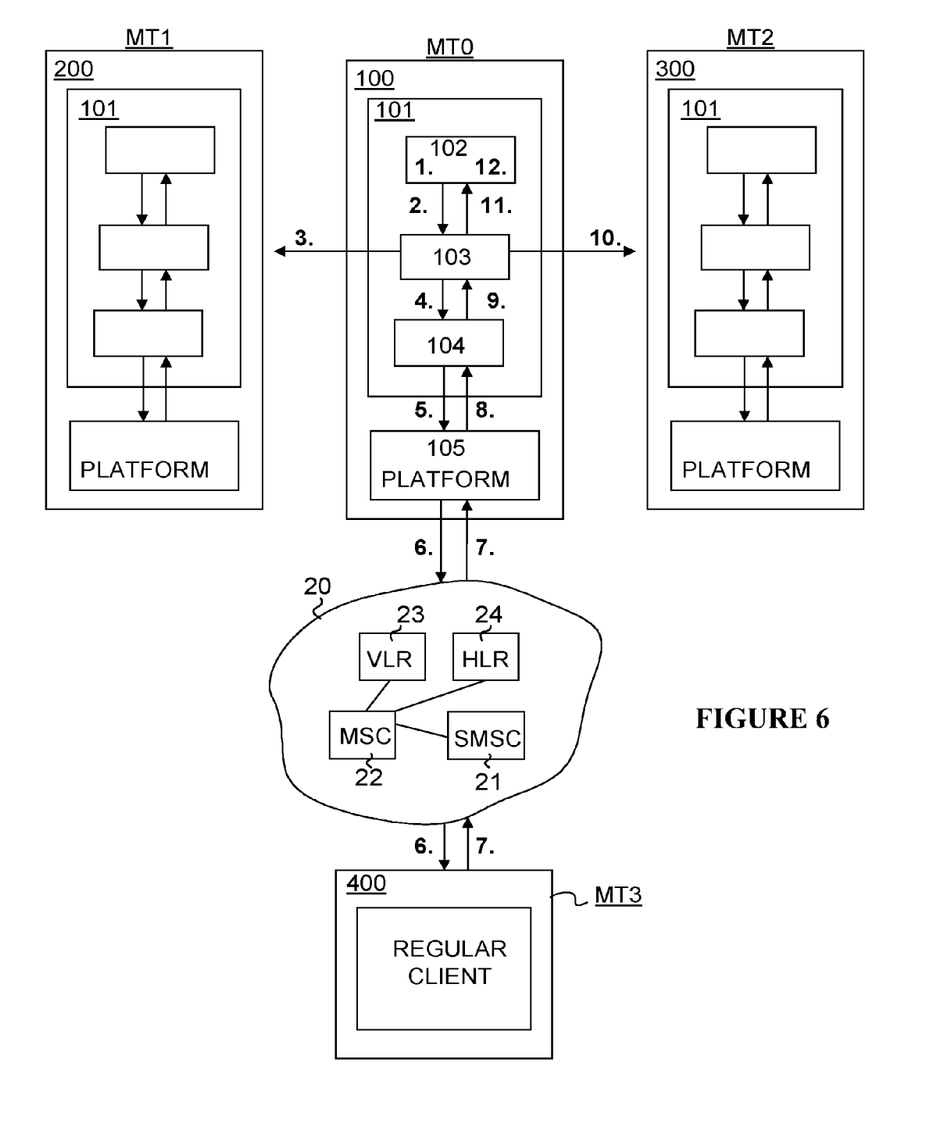
FIG. 6 illustrates an overview of a fourth exemplary scenario according to another exemplary embodiment of the present invention.

In FIG. 6 there is illustrated yet another exemplary scenario in accordance with yet another exemplary embodiment of the present invention. In this scenario, it is shown and described how the terminal client 101 of device 100 (e.g. a mobile phone, a PC, a desktop computer and/or a web server) is backward compatible with a regular prior art client residing in other devices such as a mobile phone. The figure depicted in FIG. 6 is very similar to the one already illustrated in FIG. 3. In FIG. 6, however, MT3 400 is considered to be a device (e.g. mobile phone) with a regular prior art client. As shown, MT1 200 and MT2 300 of FIG. 3 are also shown in FIG. 6. MT1 200 and MT2 300 are considered to be associated with the user of MT0 100 and thus each message is synchronized with between these devices (MT0 100, MT1 200 and MT2 300). From FIG. 6 we can also see how MT3 400 receives and sends messages to MT0 100. It should be noted that MT3 400 is, according to an embodiment of the present invention, completely unaware of the terminal client 101 and its components that are installed in MT0 100, MT1 200 and/or MT2 300. Thus backward compatibility is achieved using the exemplary embodiment of the present invention.

The present invention and its embodiments can be realised in many ways. For example, one embodiment of the present invention includes a computer-readable medium having instructions stored thereon that are executable by a computer system located in one or several client devices of a wireless and/or a fixed system, for allowing users to utilize a device independent synchronous messaging service anywhere, at anytime based for example on regular/standard SMS. The instructions executable by the computing system and stored on the computer-readable medium i.e. on the client device(s) perform the functions of the terminal client of the present invention as set forth in the claims. It should also be noted that the terminal client according to embodiments of the present invention can be incorporated/installed in any network node, i.e., in case of an SMS infrastructure, the terminal client could be installed in the SMSC, the MSC, the VLR, the HLR and/or any other network node. In such scenario, the distributed inbox client terminal installed in one or several of these nodes are synchronized with each other as soon as a message is acquired or sent by a user. The different network nodes may further be configured to route all incoming messages intended for a user to the SMSC in the home network of the user, although this is not necessary to achieve the benefits of the present invention.

While the invention has been described in terms several embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A terminal client for a client device of a user, for enabling management of messages in a telecommunications system, the terminal client comprising:
    a distributed inbox client component configured for synchronizing incoming and outgoing messages with at least one other distributed inbox client component in at least one other client device associated with the user;
    a connector component configured at least as an interface between the distributed inbox client component and a network infrastructure of the telecommunications system for handling the messages and further configured to be used by the distributed inbox client component to receive and send the messages;
    wherein the distribute inbox client component is further configured for synchronizing the incoming and outgoing messages independently of which client device is in use by the user.

2. The terminal client of claim 1, wherein the messages are short message service (SMS) messages.

3. The terminal client of claim 2, wherein the distributed inbox client component is further configured for synchronizing the incoming and outgoing messages based on standard SMS.

4. The terminal client of claim 1, wherein the distributed inbox client component is further configured for synchronizing chat sessions, based on short message service (SMS)

messages, with at least one other disturbed inbox client component in at least one other client device associated with the user.

5. The terminal client of claim 4, wherein each SMS message in a chat session is configured to be classified based on a receiver of the message, a sender of the message, and a time the message is received or sent.

6. The terminal client of claim 5, wherein the receiver and the sender are identified based on respective identification numbers, and the time is identified by a timestamp.

7. The terminal client of claim 6, wherein the identification number of the receiver is a telephone number, and the identification number of the sender is a telephone number.

8. The terminal client of claim 7, wherein the telephone numbers of the receiver and sender and the timestamp are configured to be encapsulated in a format containing at least one additional header in the message.

9. The terminal client of claim 1, wherein each message that the distributed inbox client component is configured for synchronizing with other distributed client components is identified by a respective text file having a unique file name based on a message header and is further configured to be synchronized using a synchronization protocol.

10. The terminal client of claim 1, wherein the distributed inbox client component is further configured for synchronizing, upon the terminal client being connected again to the network infrastructure, a message and a change made to the message off-line by the user.

11. The terminal client of claim 1, further comprising a user interface component configured for enabling at least the user to at least create, search, delete, manage, and view messages.

12. A client device, comprising a terminal client according to claim 1.

13. The client device of claim 12, wherein the client device is configured for storing each message created by a user of the client device in a local distributed inbox client component, and for synchronizing created messages, using the local distributed inbox client component, with at least one other distributed inbox client component in at least one other client device associated with the user.

14. The client device of claim 13, wherein the local distributed inbox client component is further configured for forwarding a created message to a local connector component, which further sends the created message to an intended receiver via the network infrastructure.

15. The client device of claim 14, wherein the client device is configured for intercepting, using the local connector component, messages received from other users, and for storing intercepted messages in the local distributed inbox client component, and for synchronizing the intercepted messages with at least one other distributed inbox client component in at least one other client device associated with the user.

16. The client device of claim 13, wherein the at least one other distributed inbox client component in at least one other client device associated with the user is configured for forwarding a synchronized message to a local connector component which further sends the synchronized message to an intended receiver via the network infrastructure.

17. The client device of claim 16, wherein the local connector component is configured for intercepting messages from other users, for storing intercepted messages in the distributed inbox client component, and for synchronizing the intercepted messages with at least one other distributed inbox client component in at least one other client device associated with the user.

18. The client device of claim 12, wherein the client device is configured as a mobile terminal, a mobile phone, a personal data assistant (PDA), a wireless terminal, a radio terminal, a web server, or a personal computer; and other client device associated with the user is configured as a mobile phone, a PDA, a wireless terminal, a radio terminal, a personal computer, a web server, a short message service (SMS) gateway network node, or a network node configured for incorporating the terminal client.

19. The client device of claim 18, wherein the client device is configured as the SMS gateway network node or the network node configured for incorporating the terminal client, and is configured for storing in a local distributed inbox client component messages intercepted by a local connector component.

20. The client device of claim 18, wherein the client device is configured as the mobile terminal, the mobile phone, the PDA, the wireless terminal, the radio terminal, the web server, or the personal computer, and comprises a user interface component enabling a user of the client device to create, search, delete, manage, and view messages.

21. The client device of claim 12, wherein the client device is configured for sending and receiving short message service (SMS) messages to and from devices with regular SMS clients.

22. A network infrastructure of a telecommunications system, comprising a client device according to claim 12.

* * * * *

UNITED STATES PATENT AND TRADEMARK OFFICE
CERTIFICATE OF CORRECTION

Page 1 of 1

PATENT NO.      : 8,452,314 B2
APPLICATION NO. : 12/738640
DATED           : May 28, 2013
INVENTOR(S)     : Kristiansson et al.

It is certified that error appears in the above-identified patent and that said Letters Patent is hereby corrected as shown below:

On the title page, item (75), under "Inventors", in Column 1, Line 2,
delete "Amgren," and insert -- Arngren, --, therefor.

In the Specification

In Column 9, Line 23, delete "ne" and insert -- be --, therefor.

Signed and Sealed this
Sixteenth Day of September, 2014

Michelle K. Lee
*Deputy Director of the United States Patent and Trademark Office*